US005186706A

United States Patent [19]

Hartness et al.

[11] Patent Number: 5,186,706

[45] Date of Patent: Feb. 16, 1993

[54] CARTON ERECTING MACHINE

[75] Inventors: Thomas S. Hartness; Thomas P. Hartness, both of Greenville, S.C.

[73] Assignee: Hartness International, Inc., Greenville, S.C.

[21] Appl. No.: 580,107

[22] Filed: Sep. 10, 1990

[51] Int. Cl.[5] .......... B31B 5/78; B31B 5/80; B65H 5/02; B65G 47/34

[52] U.S. Cl. .......... 493/316; 493/309; 414/795.8; 414/796.8

[58] Field of Search .......... 493/122, 123, 124, 125, 493/309, 313, 316, 317; 414/795.8, 796.8

[56] References Cited

U.S. PATENT DOCUMENTS

| | | | |
|---|---|---|---|
| 2,289,820 | 7/1942 | Ardell | 493/316 |
| 3,739,696 | 6/1973 | Pearson | 493/316 |
| 3,976,208 | 8/1976 | Buix et al. | 414/796.8 |
| 3,998,448 | 12/1976 | Gray et al. | 414/795.8 |
| 4,119,219 | 10/1978 | Marschke | 414/795.8 |
| 4,498,893 | 2/1985 | Odom | 493/316 |
| 4,907,941 | 3/1990 | Focke et al. | 414/795.8 |

*Primary Examiner*—William E. Terrell
*Attorney, Agent, or Firm*—Dority & Manning

[57] ABSTRACT

A carton erecting and finishing machine is disclosed as including a conveying system for directing stacks of flat carton blanks to a lifting station whereat a stack is vertically lifted to present the topmost blank to a feed station. A blank separating device is arranged to feed each of the blank seriatim to a carton erecting station to be actetd upon by vacuum caps to open the carton by erecting the side panels. While at the erecting station and immediately after erecting of the side panels, a first pair of flap-folding devices are activated to fold the bottom end flaps of the erected carton. While still at the erecting station and immediately after activation of the first set of flap-folding devices, a second pair of flap-folding devices are activated to partially fold the bottom side panels over the previously folded end flaps. A raking device is next activated to move the erected carton to a gluing station where gluing devices are arranged to apply glue to the folded bottom end flaps. After the application of glue, a compression plunger is directed through the interior of the carton to compress the side panels upon the end panels thereby finishing the mounting of the open carton preparatory to the use thereof.

9 Claims, 12 Drawing Sheets

Fig. 9
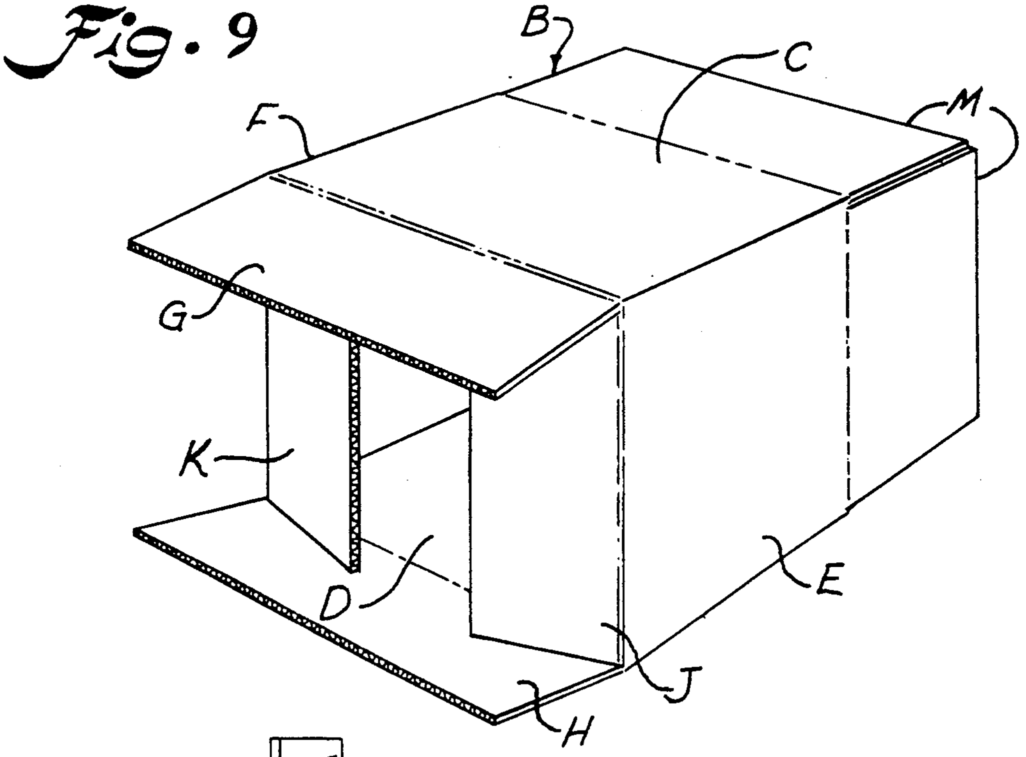
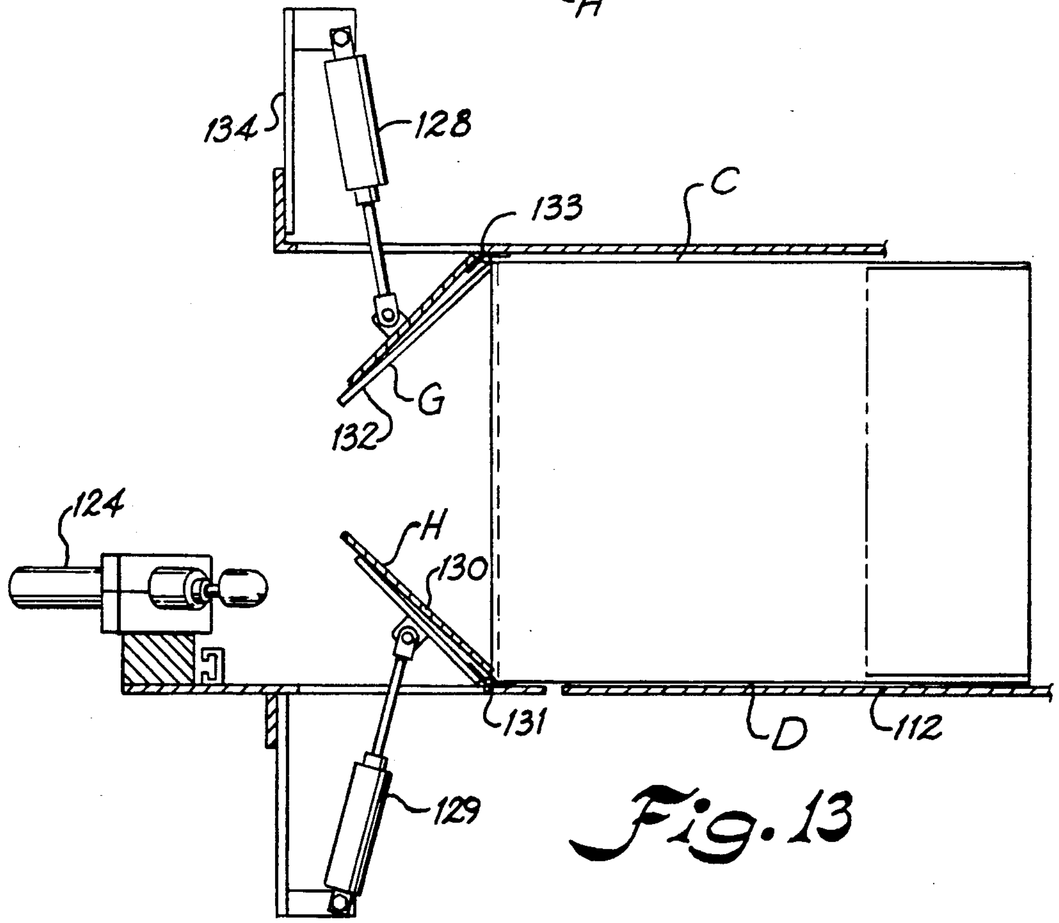
Fig. 13

CARTON ERECTING MACHINE

BACKGROUND OF THE INVENTION

The present invention relates to carton forming apparatus, and more particularly, to an apparatus which is adapted to feed flattened carton blanks continuously to a work station whereat the blank is conditioned for the loading of articles therein.

Conventional carton forming apparatus which are arranged for handling carton blanks preparatory to the loading of articles therein include transporting devices which are adapted to receive a plurality of carton blanks and to present each of the blanks in succession to the initial work station of the apparatus.

These apparatus are arranged to receive a stack of flattened carton blanks which are generally oriented in a vertical plane or at some slight angle relative thereto. The blanks are then pushed along a path to a position whereat each of the flattened blanks are reoriented to a horizontal plane and then fed directly to the initial work station. As a stack of flattened carton blanks are depleted, the apparatus is shut down while a workman reloads the loading terminal for the transporting device with another stack of blanks to be fed thereby as in the previous cycle, and so on.

There are many disadvantages inherent in these arrangements of the prior art. The most serious disadvantage is in the stopping of production of the apparatus for each reloading sequence necessary to effect carton preparation before the loading of articles therein. The down time experienced with machine shutdown for the reloading sequence is determined by the number of carton blanks that can be reloaded at any one time, that is, by the number of such blanks that may be carried by the workman to a reloading position or the size of the reloading position which becomes a part of the overall machine for the formation of finished cartons. In either event, the time loss and increased size of the apparatus for the reloading process is costly to the overall production capability of the carton forming machine.

Another serious disadvantage in the conventional apparatus results from the vertical or near vertical orientation of the flattened carton blanks as they are being fed to the initial work station. Holding flattened carton blanks in the vertical orientation may result in the collapsing or the premature opening of the flattened nature of the blanks, or damage thereto as they move along upon their edges during transporting of the same. In order to overcome some of these prospects, additional structure is generally added or incorporated in the overall machine to hold the blanks upright as they are moved along to the initial work station. Correspondingly, additional structure must be added in order to remove or render inoperative the devices utilized to hold the blanks upon their edges.

Therefore, it is a principal object of the present invention to load flattened carton blanks to a carton forming apparatus continuously without stopping or interrupting the production cycles of the carton erecting apparatus.

Another object of the invention is to transport carton blanks to a work station whereat carton erection may be activated utilizing a minimum of machine parts and utilizing inexpensive devices in order to accomplish this operation.

In order to accomplish the foregoing objects, the present invention has been devised for feeding stacks of flattened carton blanks while in a horizontal orientation by a conveyor belt into a lift position. The conveyor system is arranged so that a workman is adapted to continuously load succeeding stacks upon the conveyor belt during operation of the conveyor to the lift position. A lifting member positioned adjacent the lift position is adapted to be driven downwardly prior to the movement of a stack to the lift position whereby the lift members will be in position immediately under the bottommost blank in that position. A power device is activated to lift the lifting members with the blanks thereon upwardly to a feed position and to be held thereat by a holding device while the lifting members are once again driven downwardly to be below the next succeeding stack of blanks being moved to the lift position after the preceding stack has been lifted.

While in the feed position, a pair of horizontally driven separating members engages the rear edge of each of the carton blanks in the stack in succession, separates the blank from the stack, and drives the same to an initial work station. While in the work station, vacuum devices are adapted to be moved into position to engage the upper and lower panels of a carton thereat, and to open the carton to condition the same for movement of the side panels of the blank by power activating devices arranged to be activated immediately after the blank has been opened up. With the carton fully opened, a conveyor is positioned to move the opened carton out of the initial work station and into a gluing station whereat gluing devices are activated to apply glue to appropriate positions upon side panels of the carton immediately prior to the activation of a driving action of a stamping plunger which is arranged to be driven into the opened carton to provide quick and appropriate pressure to the previously glued panels to secure the same under action of applied pressure.

These and other objects will become apparent after reading the following description taken in conjunction with the drawings wherein:

FIG. 9 is an isometric view of a typical erected carton showing the structural panels therefor;

FIG. 13 is a partial sectional view of a folding mechanism for folding flaps of a carton blank taken along the line 13—13 in FIG. 2;

DESCRIPTION OF THE PREFERRED EMBODIMENT

Figure 1:
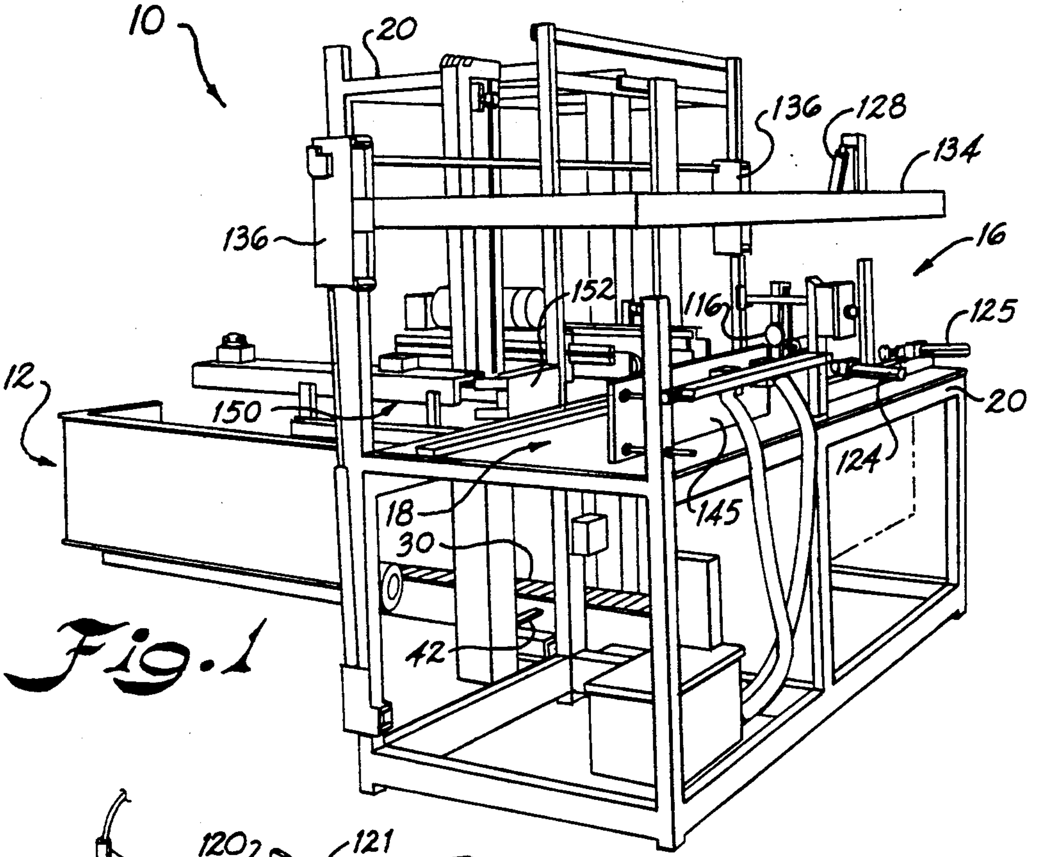
FIG. 1 is an isometric view of the carton erecting machine devised in accordance with the present invention.
Figure 2:
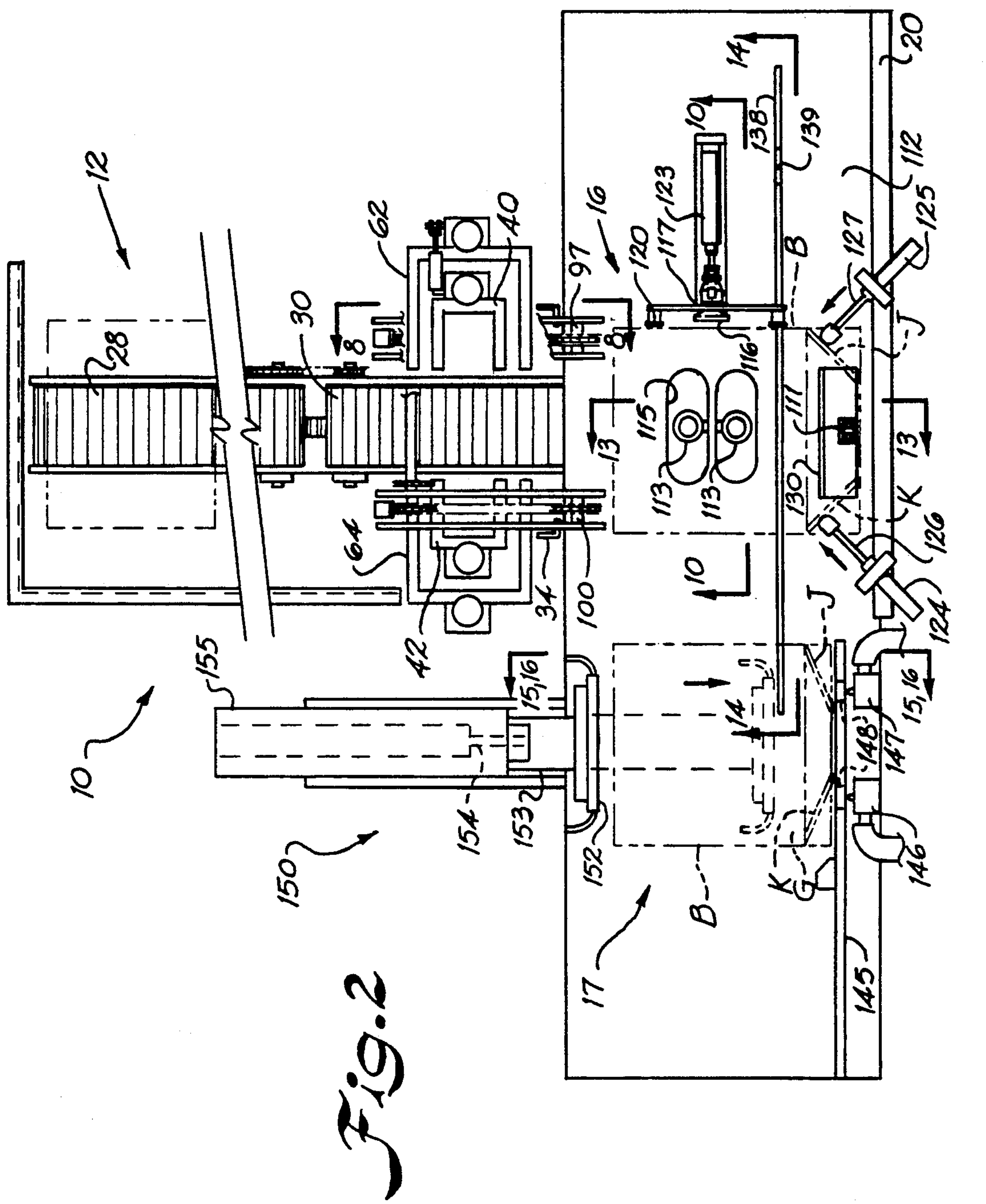
FIG. 2 is a plan view of the machine.

As shown in FIGS. 1 and 2, the carton erecting machine, generally indicated by the reference numeral 10, devised in accordance with the present invention, includes a carton blank conveyor system 12 upon which one or more stacks 14 of a plurality of flattened carton blanks are placed by a workman, with the blanks arranged in a horizontal plane, for movement to a stack lifting station. The machine 10 also includes a carton erecting station 16 to which individual carton blanks are transported for erecting, and a gluing/mounting station 17 where a gluing apparatus 18 is positioned.

The conveyor system 12 includes a frame bed 20 and two conveyor belt mechanisms 22, 24 arranged upon the support frame to be operable upon the stacks 14 in sequence, that is, adapted to move the stacks from the conveyor mechanism 22 to the conveyor mechanism 24. A drive mechanism 26, suitably operatively connected to the conveyor belt 28 for the mechanism 22, is arranged to drive the belt 30 for the mechanism 24 at a higher speed, for example, on the order of two to one, than the speed of the belt 28 for a purpose to be described hereinafter.

Figure 3:
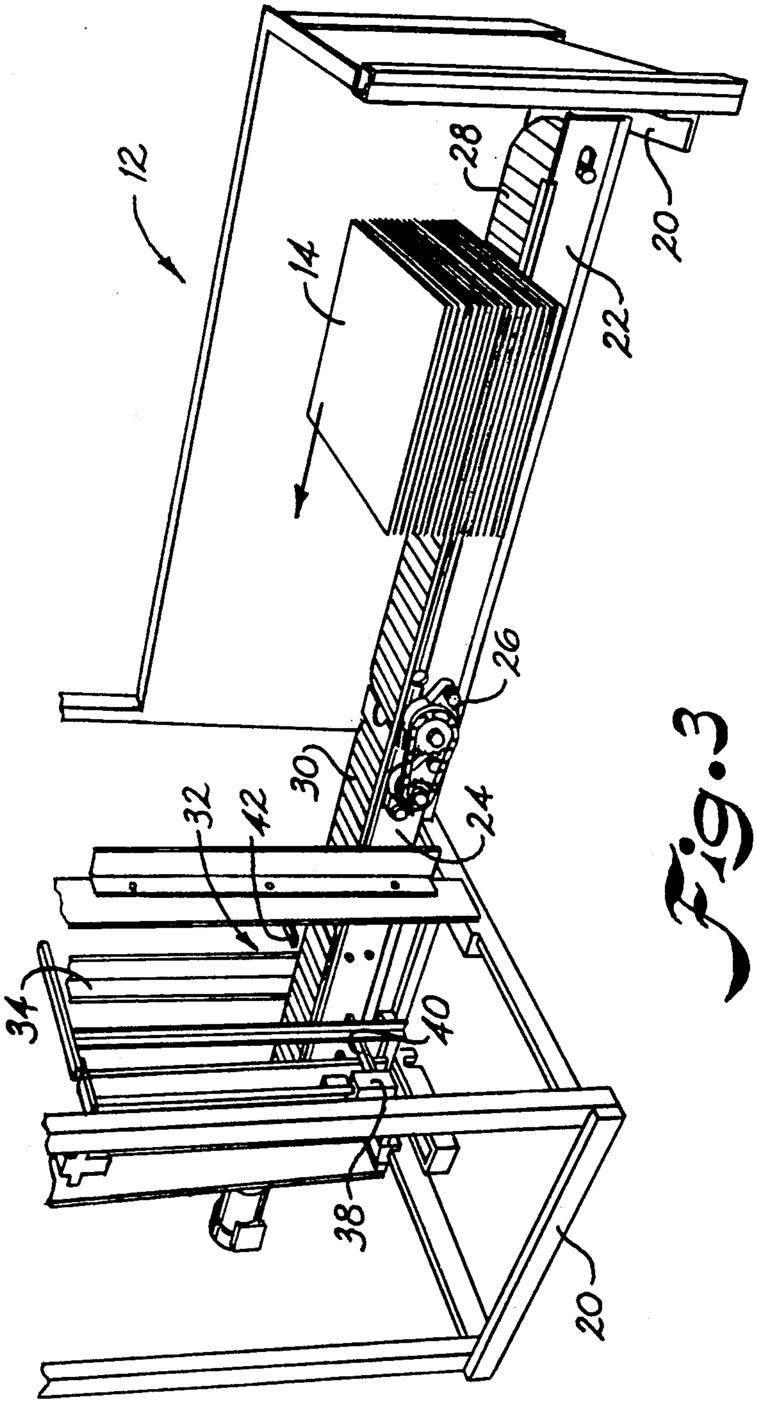
FIG. 3 is an isometric view of the conveying system for stacks of carton blanks utilized in the machine.

The belt 28 for the conveyor mechanism 22 is supplied with stacks of carton blanks by an operator without having to shut down the machine 10. With the continually moving belt 28, the stacks 14 are driven to the left as shown in FIG. 3 and deposited upon the belt 30 for the conveyor mechanism 24. Preferably, the number of stacks 14 which can be applied to the belt 28 is two, however, it will be understood that any number of stacks dependent upon the length of the belt 28 may be deposited thereon during automatic operation of the machine.

After a stack 14 has been deposited upon the conveyor belt 30, it is transported to a lift station 32 whereat further movement is stopped by a suitable stop frame member 34. In this position of the stack, the belt 30 continues moving slightly being adapted to slide relative to and immediately beneath the lowermost carton blank in the stack. This continued slight movement of the belt provides override thereof, as the belt comes to a stop condition, under control by suitably positioned photocells and the machine controller.

Adjacent the lift station 32 and spaced on either side of the conveyor belt 30 are vertically movable, lift members 38, 39 to which are secured two pairs of inwardly projecting fingers 40, 42, respectively. When the machine 10 is not in the operating mode, the two pairs of fingers 40, 42 are arranged generally slightly below the plane of the belt 30, as shown in FIG. 5, so as to be positioned under a stack 14 when the same is moved by the conveyor mechanism 24 against the stop frame 34.

The lift members 38, 39 are connected at the lower end of piston rods 44, 46 associated with double acting, fluid operable rams 48, 50, respectively, mounted in vertical orientation at their uppermost ends by brackets 51, 52, mounted at the upper end of a frame 54 of the machine. The rams 48, 50 are rigidly held by the frame 54 by the brackets 51, 52, respectively, and a vertically extending structural member 55, 56 secured to the lower end of the rams and the bed frame 20 for the machine 10. Each of the members 38, 39 are slidably mounted on the structural members 55, 56, respectively, for guiding the upward and downward vertical movement thereof, and consequently, the lift fingers 40, 42.

Figure 5:
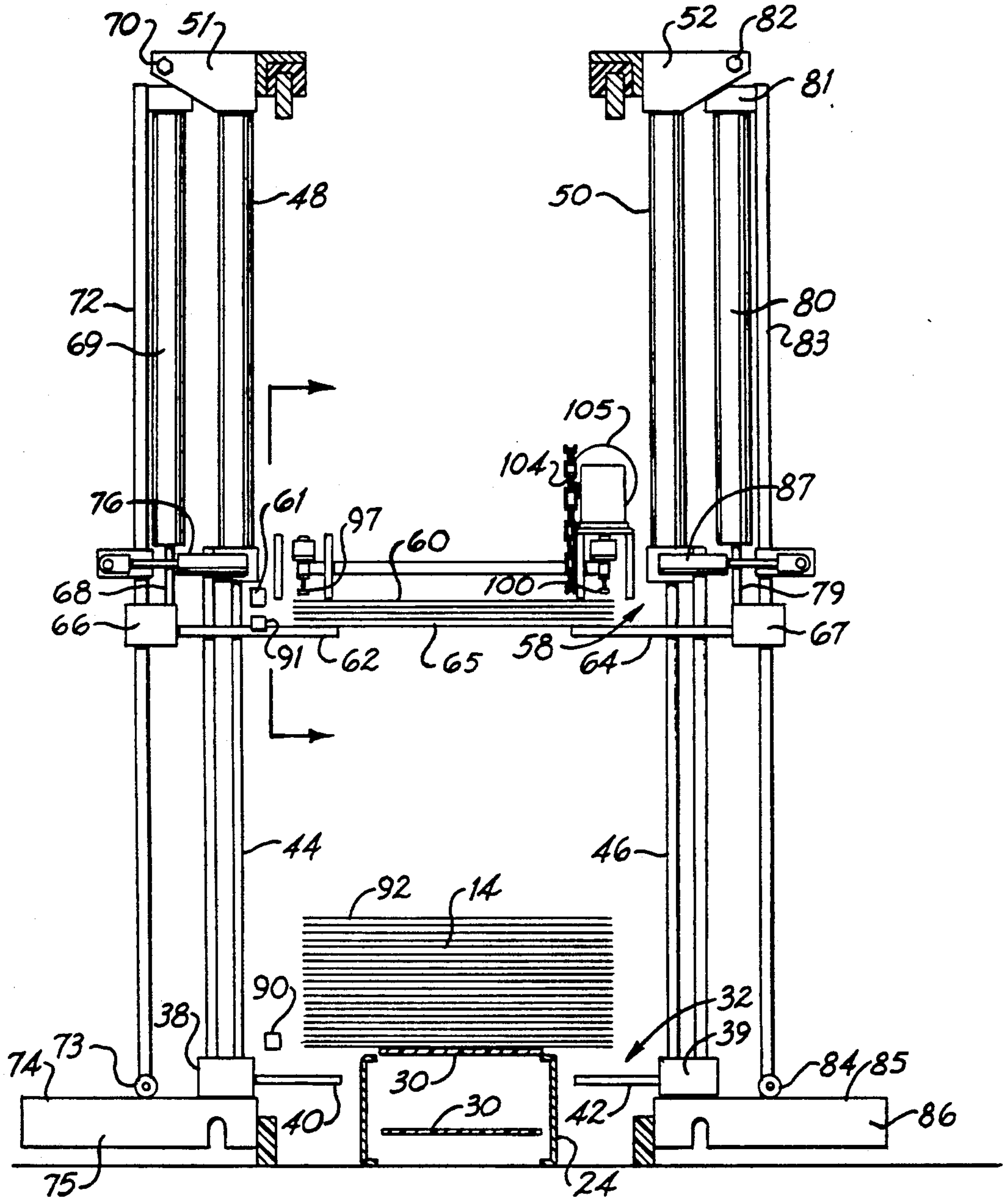
FIGS. 5, 6 and 7 are elevational views of the lifting mechanism shown in various stages of operation.
Figure 6:
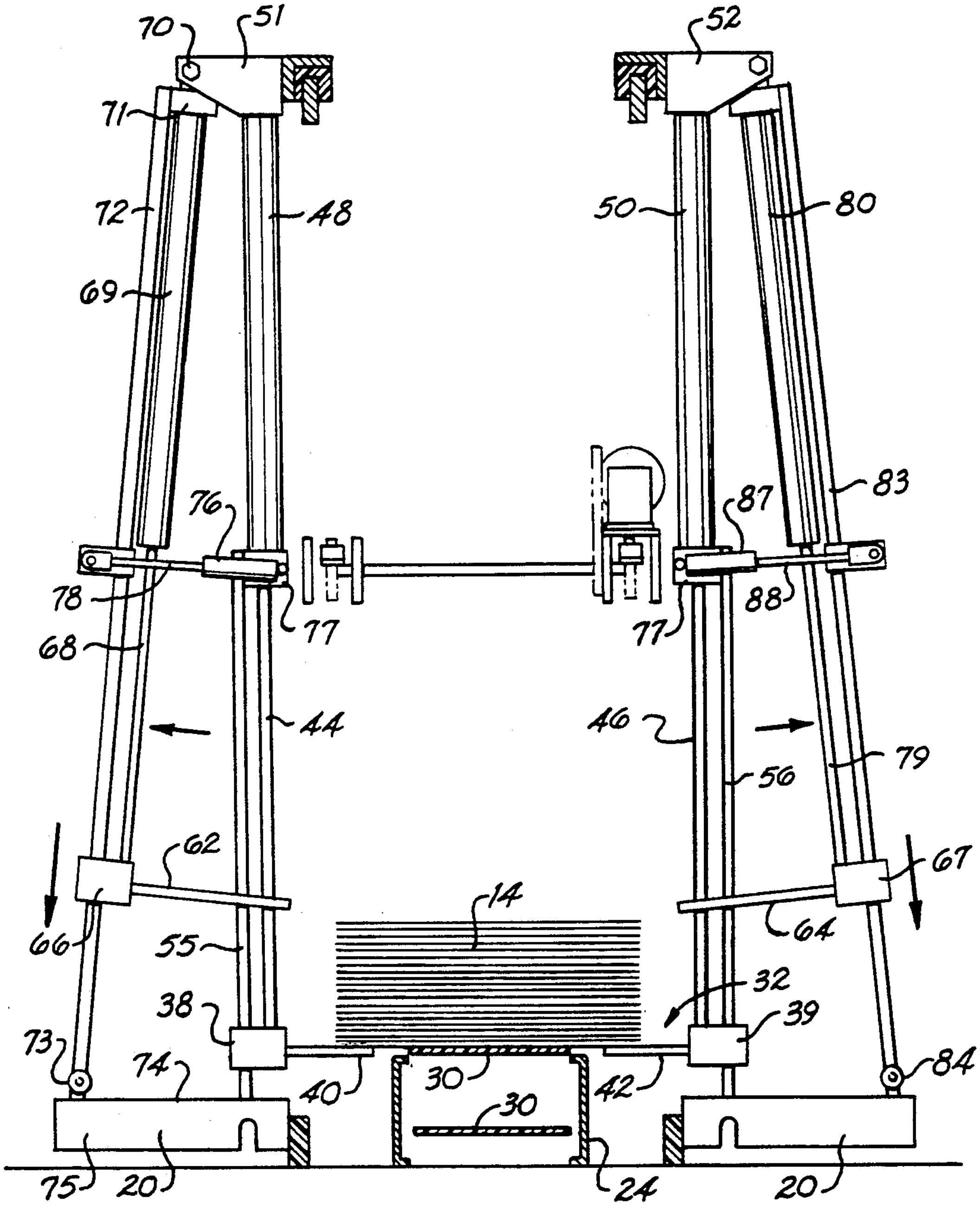

Upon actuation of the rams 48, 50 in unison, the lift members 38, 39 are lifted vertically from the position shown in FIG. 5 to the position shown in FIG. 6 wherein the fingers 40, 42 engage the lowermost carton blank in the stack 14. Continued actuation of the rams continue the lifting movement of the fingers 40, 42 to the position shown in FIG. 7 to the feed station 58 for the machine 10. Upon reaching the uppermost limit of vertical movement of the stack 14 whereat the topmost blank 60 is in position to be fed from the stack 14, the blank 60 engages and actuates a limit switch and sensing device 61 whereupon the fluid pressure in the rams 48, 50 is deactivated to terminate further lifting action.

Figure 4:
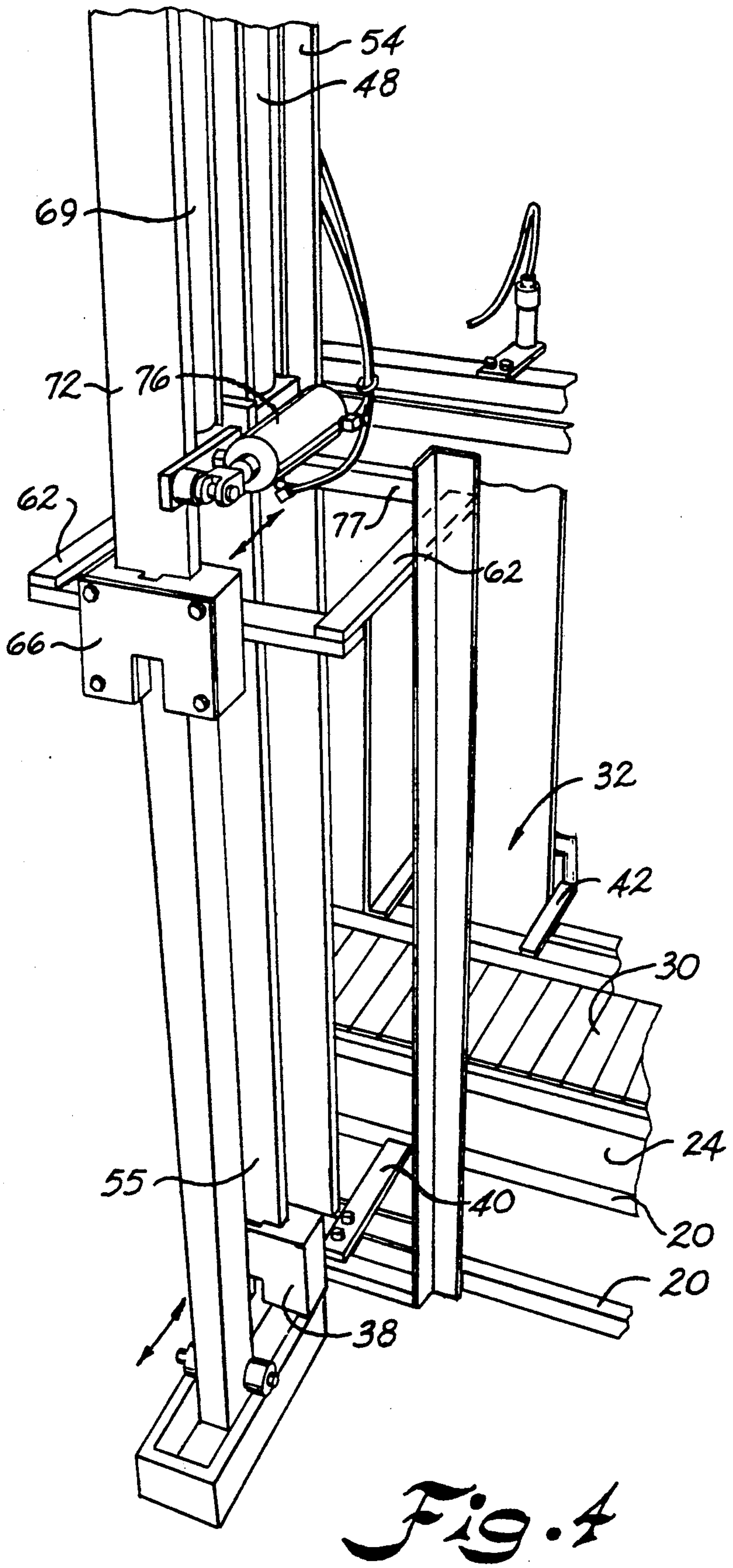
FIG. 4 is an isometric view of the lifting mechanism in the machine for lifting a stack of carton blanks and to present the same to a carton blank feeding station.

Upon reaching the feed station 58, the stack 14 is held thereat by two pairs of holding fingers 62, 64, which are adapted to be moved into position against the lowermost carton blank 65 in the stack and assume a position in the same plane as the lift fingers 40, 42, respectively. As shown in FIG. 4, the pairs of holding fingers 62, 64 are spaced horizontally a slightly greater distance than the spacing of the pairs of fingers 40, 42, so that all of the pairs may be oriented in the same plane when both are positioned to engage the lowermost blank 65 of the stack being held in the feed station.

The two pairs of holding fingers 62, 64 are secured to slidable members 66, 67, respectively. The slidable member 66 is connected to the lower end of a piston rod 68 for a double acting, fluid operable ram 69 vertically oriented in parallel with the ram 48 but mounted for slight pivotal movement in a vertical plane on a pivot pin 70 held in the bracket 51 and pivotably engageable with a bracket 71 secured at the upper end to the ram 69. An elongated guide element 72, having its upper end secured to the ram bracket 71 and extending downwardly and parallel to the axes of the ram 69 and rod 68, and terminating in a roller 73 secured at the lower end thereof, serves to support and guide the vertical movement of the member 66. The roller 73 is mounted for rolling action on a pin movable in a slot (not shown) formed at the lower end of the element 72 for permitting slight overriding the roller, and is adapted to ride upon the top surface 74 of a member 75 of the machine bed 20 between the two positions shown in FIGS. 5 and 6. During pivotal movement of the ram 69 between the positions shown in FIGS. 5 and 6, the roller 73 rides to and fro on the surface 74 thereby stabilizing the associated structure.

Pivotal movement of the ram 69 and rod 68 from the position shown in FIG. 5 to FIG. 6 causes a sliding movement of the fingers 62 from the bottom of the lowermost blank in the stack 14 which occurs when the pairs of fingers 40, 42 are positioned as shown in FIG. 6 to hold the stack 14. Upon actuation of the ram 69, the pair of fingers 62 are lowered as shown in FIG. 6 to be completely removed from engagement with the stack.

Further operation of this mechanism will be described hereinafter.

The afore-described pivotal movement of the ram 69 is accomplished by a double acting, fluid operable ram 76 secured to a frame member 77 and including a piston rod 78 pivotally connected to the guide member 72. Activation of the ram 76 in either direction effects the pivotal movement of the ram 69 and the inward and outward movement of the fingers 62, 64.

The fingers 64 are also arranged for movement out from under the stack 14 as shown in FIG. 6 and raising and lowering thereof by mechanisms similar to those associated with the fingers 62. The pair of fingers 64 are secured to the slidable member 67 secured to the lower end of a piston rod 79 associated with a fluid operable ram 80. The upper end of the ram 80 is supported by a bracket 81 pivotally connected to the bracket 52 by a pivot pin 82. An elongated element 83, having its upper end connected to the bracket 81, extends downwardly and is parallel to the ram 80 and the piston rod 79, and terminates with a wheel 84 adapted to roll along the upper surface 85 of a member 86 which forms part of the machine bed 20.

The to and fro movement of the pair of fingers 64 and the vertical movement thereof, is exactly the same as for the fingers 62, and is synchronized therewith. For the inward and outward movement, a double acting, fluid operable ram 87 and rod 88, connected between the frame member 77 and the member 83, is provided to be operable with the ram 80.

As shown in FIG. 6, the rams 69, 80 are adapted to be moved outwardly in unison to remove the pairs of fingers 62, 64 from underneath the lowermost carton blank 65 of the stack 14 after the same has been lifted to the feed station 58 by the pairs of fingers 40, 42.

In the operation of the conveying system 12, as illustrated in FIGS. 3, 5, 6 and 7, the operator loads stacks 14 of carton blanks upon the belt 28 for the conveying mechanism 22. The stack 14 is driven to the left, as viewed in FIG. 3, and upon the conveyor belt 30 which is driven at a faster speed than the belt 28. After this movement of the stack is arrested by the frame 34, both belts 28 and 30 come to a stop under control by the machine controller. After stopping of the belt 28, the operator may add still another one or more stacks 14 to the belt 28.

When the stack 14 is at the lift station 32, the lift fingers 40, 42 will be positioned immediately below on either side of the stack. As shown in FIG. 5, it is assumed that a few remaining carton blanks are still being fed from the feed station 58 and that a succeeding stack 14 is positioned immediately below the remaining blanks in order to permit continuing operation of the machine 10. After the stack reaches the lift station 32, the limit sensing device 90, such as a photocell, is actuated to indicate the presence of a stack at the lift position to the controller for the machine system. Another photocell device 91 is arranged to detect the absence of the bottommost blank 60 when only a few remain in the feed station 58. This latter sensing of the absence of a blank causes actuation of the rams 48, 50 which produces the lifting movement of the fingers 40, 42 into engagement with the lower blank of the stack 14, and continued movement thereof vertically upwardly until the topmost blank 92 on the stack 14 engages the holding fingers 62, 64 which are positioned to hold the remaining few blanks of the previously lifted stack.

With the new stack 14 below the remaining blanks of the previous stack, the rams 76, 87 are actuated in unison to pivotally rotate the respective rams 69, 80 and their associated guide members 72, 83 about their respective pivots 70, 82 to remove the fingers 62, 64 out from under the remaining blanks in the stack. During and after this sliding movement of the fingers 62, 64, the remaining blanks of the previously fed stack together with the new stack 14 are held in the feed position by the pairs of lift fingers 40, 42. With the fingers 62, 64 being moved outwardly, the rams 69, 80 are actuated to move the pairs of fingers 62, 64, respectively, downwardly, as shown in FIG. 6 in order to clear the sides of the stack 14.

Figure 7:
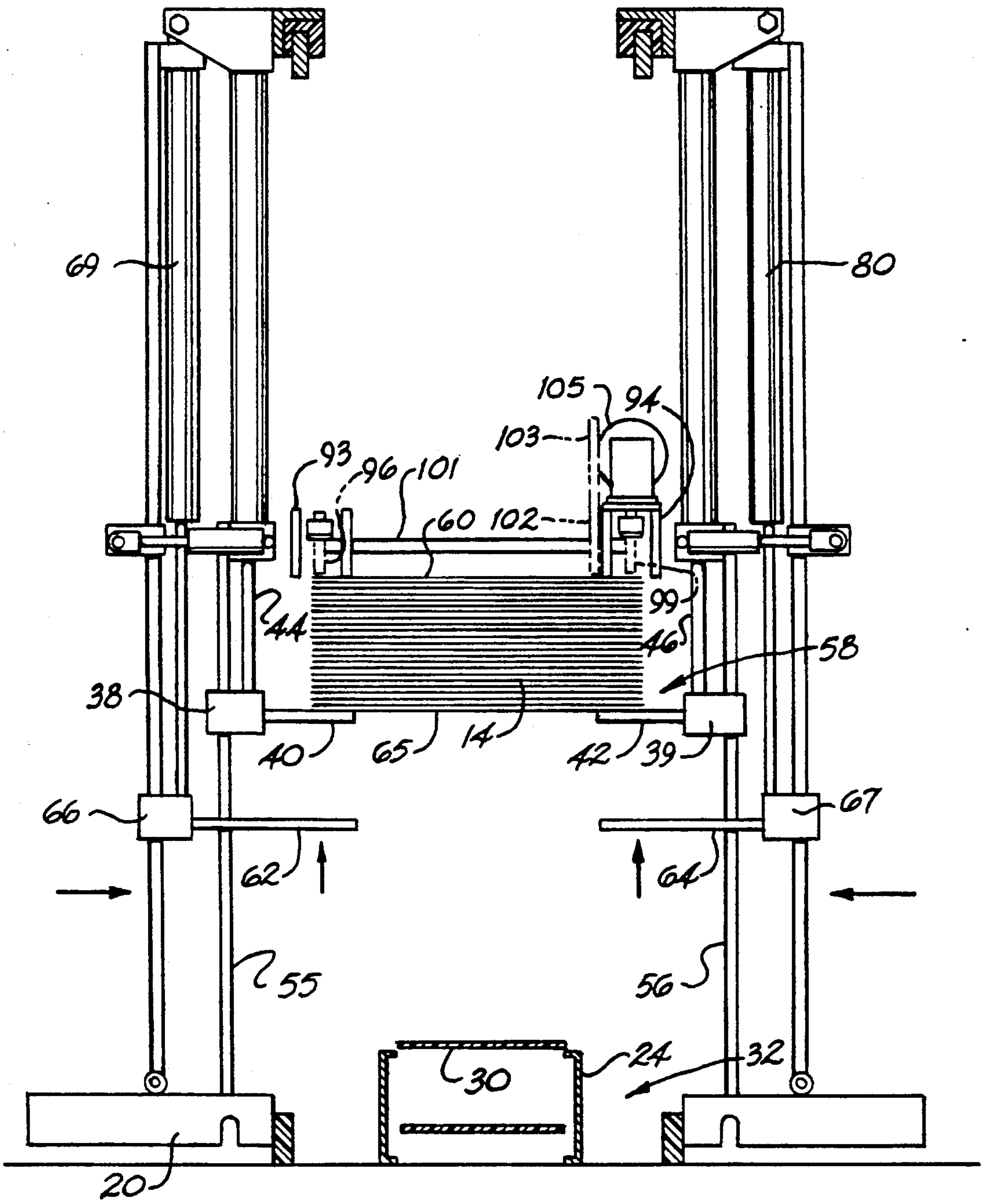

These rams are again actuated in the reverse direction to cause the pairs of fingers 62, 64 to move vertically upwardly and into engagement with the lowermost blank in the stack 14 as shown in FIG. 7. In assuming this position, the pairs 62, 64 are in the same plane as the pair of lift fingers 40, 42 but on either side of the respective fingers. The holding fingers 62, 64 are now in position to maintain the stack 14 in the feed station. Upon this occurrence, the controller for the machine system is arranged to produce downward vertical movement of the pairs of lift fingers 40, 42 to the position originally shown in FIG. 5 for the start of a new cycle of operation for another stack 14 positioned upon the conveying system. Such new cycle of operation involves the restarting of the conveying system 12 to move another stack 14 to the lift station 32, as aforesaid.

Figure 8:
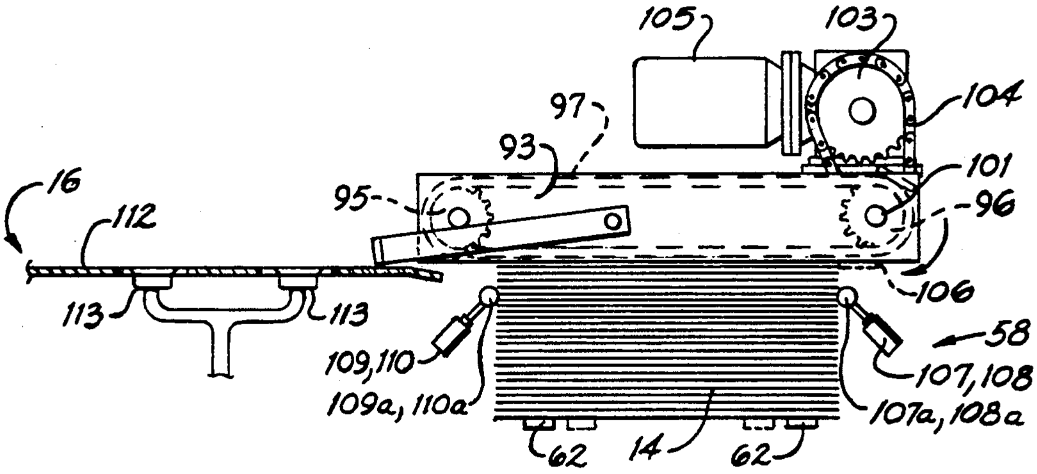
FIG. 8 is a partial sectional view of the carton blank feeding station taken along the line 8—8 in FIG. 2.

With a stack 14 in the feed station 58, as shown in FIGS. 5, 7 and 8, each of the carton blanks are in position to be fed seriatim from the top of the stack. Immediately above the stack and spaced slightly inwardly from the sides thereof are a pair of frames 93, 94 which are arranged in parallel and extend along a direction of travel of the conveyor belt 30. At each end of the frame 93 are forwardly and rearwardly mounted rotatable sprockets 95, 96, respectively. An endless chain 97 is trained around the sprockets and is positioned for travel along the adjacent edge of the stack 14. Similarly, the frame 94 is provided with sprockets 98, 99 at the ends thereof for entraining a chain 100 therearound and in position adjacent the other side of the stack 14. The rear sprockets 96, 99 are connected together by a shaft 101 having a gear 102 drivingly connected to a drive gear 103 by a suitable chain 104 driven by a motor 105 mounted on the frame 94.

Each of the chains 97, 100 has secured outwardly thereof a pick-off lug 106, only one of which is shown in FIG. 8. The lugs 106 are arranged in transverse alignment and are adapted to be driven in unison during movement of the chains for simultaneously engaging the rear edge of the topmost blank 60. For each complete driving movement of the chains, the lugs 106 engage and slide the topmost carton blank and drives the same forwardly or from right to left as shown in FIG. 8. As each of the carton blanks are fed from the top of the stack 14, as stated above, the pressure within the holding rams 69, 80 is such that continual movement of the lifting fingers 62, 64 are maintained so that the stack 14 continues to move upwardly as each topmost blank is fed from the top thereof thereby ensuring that each of the carton blanks in the stack are in position to be engaged by the lugs 106 and transported out of the feeding station 58.

In order to prevent the possibility of the lugs 106 not engaging the trailing edges of the carton blanks during feeding from the stacking in the feed station 58 caused by bending or down-turning of the trailing edges, a pair of double acting pneumatic rams 107, 108 with cooperating rollers 107*a*, 108*a*, are positioned along the trailing edges adjacent the corners. As shown in FIG. 8, similarly a pair of double acting pneumatic rams 109, 110 and cooperating rollers 109*a*, 110*a* are positioned relative to the leading edges of the stack. As shown in FIG. 8, the rams are oriented approximately 45° to the vertical and when activated, drive their respective rollers against the edges of the carton stack to lift the same upwardly so that in the case of the trailing rollers 107*a*, 108*a*, the trailing edges of the stack will be in position to be engaged by the moving lugs 106 during separation of each of the carton blanks. The leading rollers 109*a*, 110*a* serve to maintain the flatness and level of the blanks as they are separated and moved to erecting station 16.

The rollers 107*a*, 108*a*, 109*a*, and 110*a* are positioned to engage and be effective upon four to six of the top cartons, and when the rams 69, 80 are driving the lifting fingers upwardly during feeding of the carton blanks. The rams are activated by the machine controller to lift the corresponding rollers only when the machine is in the lift mode and in time sequence therewith. When the lifting fingers 40, 42 are elevating a new stack and the hold fingers 62, 64 are being activated, the rams 107, 108, 109, 110 are retracted so as not to interfere with the upward movement of the carton blanks.

The carton B envisioned for treatment in the present invention is of the conventional type, being illustrated in FIG. 9 as comprising two major side panels C, D, two end panels E, F, and a bottom panel defined by two side flaps G, H, and two end flaps J, K. The top panel of the carton comprising the customary flaps M remains open and unaffected during operation of the invention. The aspect of the invention described below is directed to the partial folding of the flaps defining the bottom panel, the applying of adhesive material to designated positions on the bottom end flaps J, K, and the application of pressure upon the bottom flaps to produce the bottom panel, thereby completing the assembly of the carton with the top panel M in open condition.

Figure 10:
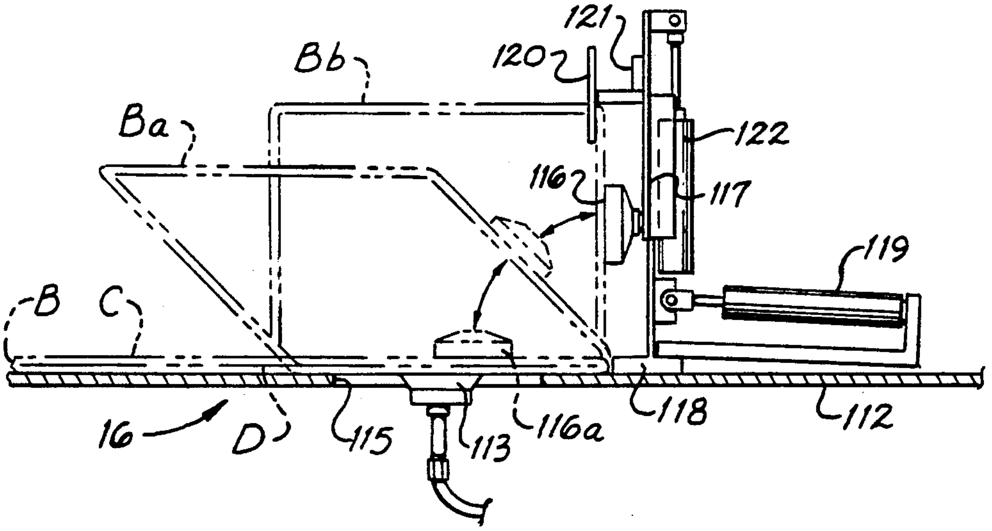
FIG. 10 is a partial sectional view taken along the line 10—10 FIG. 2.

Carton blanks being fed from the feed station 58 are transported to the erecting station 16 as shown in FIGS. 2 and 10 and are adapted to engage a stop member 111 positioned in the path of movement of each of the fed carton blanks. When further movement of the carton blank B has been arrested and still in the flattened condition, the same is held upon and against the top surface of a horizontally positioned table surface 112 by a pair of suction cups 113 adapted when evacuated to grip and hold momentarily the major panel D of the blank B. The table 112 forms part of the machine frame 20 and serves to locate the erecting station 16 whereat the carton B is held during erecting thereof. The vacuum cups 113 are positioned within slots 115 formed on the table surface plate 112 so as to be in gripping position with the major panel after the same has been stopped in its movement in the station 16.

Immediately after the blank B is gripped by the vacuum cups 113, a vacuum cup 116 mounted on a pivoted elongated plate 117 is moved from the position shown in FIG. 10 in full lines to the position shown at 116*a* in dotted lines whereupon the vacuum cup 116 is in engagement with the other major panel C of the blank B. Upon vacuum evacuation of the cup 116, the cup is lifted back to the original position as shown in full lines so as to erect the carton from its initial flattened orientation, to an intermediate position shown at Ba to its final erected orientation shown at Bb. Pivotal movement of the plate 117, pivoted at 118, is provided by a fluid operable ram 119 arranged on the table 112.

In the event that the carton blank B will not erect by the operation of the vacuum cup 116 due to the presence of errant glue between the panels, a mechanical erector is incorporated into the erecting system. This mechanical erector comprises a tab 120 secured to each end of a bar member 121 slidably mounted at its midpoint to the outer end of the plate 117. The tabs 120 are adapted to be moved in either direction relative to the plate 117 by a pneumatic ram 122 mounted on the plate 117.

Figure 12:
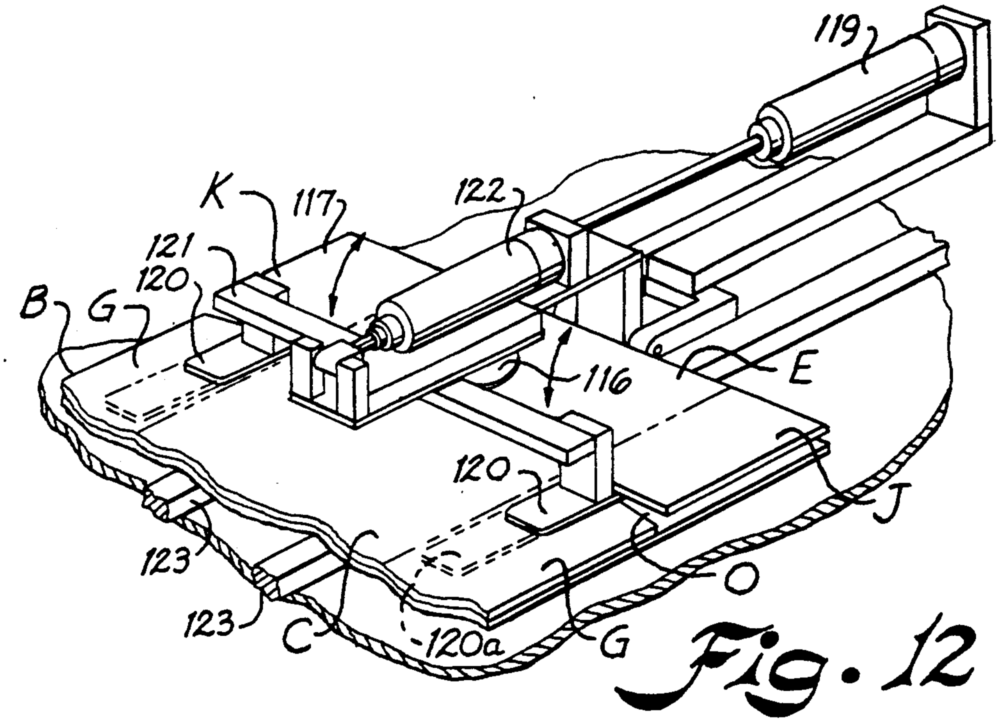
FIG. 12 is an isometric view of the erecting mechanism in another position of operation.

After a blank has been moved into the erecting station 16 and the vacuum cup 116 has been moved to the position shown in dotted lines 116*a* in FIG. 10 and in FIG. 12, by actuation of the ram 119, the tabs 120 will be driven downwardly against the panel C of the carton blank. This action causes the panel C and side flaps G, M to flex downwardly against parallel rails 123 mounted on the table 112 to produce a slight opening between the opposed edges of the flaps G, M and the panels J, M, indicated at 0. Upon actuation of the ram 122, to retract the same, the tabs 120 are moved horizontally to extend into the openings 0. This action is followed by actuation of the erecting ram 119 to rotate the plate 117 to the position shown in full lines in FIG. 10 and thereby produce erection of the carton as shown in position Bb. After the carton has been erected, the ram 122 is again activated to extend the tabs 120 outwardly so as to be in the position they would occupy for another cycle of operation, as shown in the dotted positions 120*a* in FIG. 12.

Mounted on either side of the stop member 111 and in path of movement of the blank B and moving from the feed station to the erecting station is a pair of plunger mechanisms activated by fluid operable devices or rams 124, 125. Each of these devices includes a plunger 126, 127, respectively, having their respective axes of movement at an acute angle relative to the path of movement as shown in FIGS. 2 and 10. Each of the plungers 126, 127 is adapted when actuated to engage the bottom end flaps J, K of the carton blank B, when the same has been fully erected, in order to fold the respective outwardly extending end flaps inwardly toward each other to flat or nearly flat condition.

While the carton blank B is positioned in the erecting station 16 as shown in FIG. 10, and immediately after the bottom end flaps J, K have been folded inwardly as described, the bottom side panels G, H are also simultaneously folded toward each other to positions, as shown in FIG. 13, by a folding mechanism comprising a pair of fluid operable rams 128, 129. The lower ram 129 is arranged below the table 112 and is pivotally connected to a plate 130 arranged for pivotal movement along an edge at 131 relative to the table top 112.

In its inoperable position, the plate 130 is flush with the table top 112 as the side flap H rests thereon when the carton blank B is initially moved to and stopped in the erecting station 16. The other end of the ram 129 is pivotally connected to the frame of the machine so that upon actuation of the ram, the plate 130 moves from its normal inoperative position in the plane of the table top 112 to the position shown in FIG. 13.

Immediately above the plate 130 is an upper plate 132 pivotally mounted along an edge at 133 to an upper frame structure 134 which is arranged above and in parallel with the horizontal bed frame 20. The frame structure 134 is supported on the frame 20 and by a pair of adjusting mechanisms 136 mounted on the bed frame for permitting the vertical positioning of the structure 134 and, therefore, the ram 128 to accommodate carton blanks of different sizes.

Figure 14:
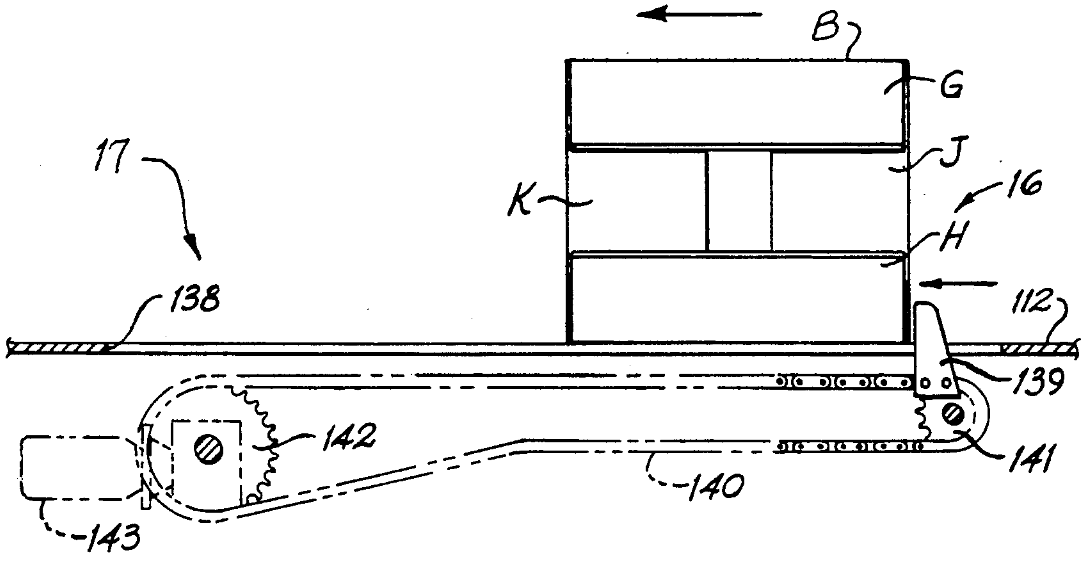
FIG. 14 is a cross-sectional view of the transport mechanism taken along the line 14—14 in FIG. 2 for moving a partially erected carton from the erecting station to a gluing station.

After the actuation of the rams 128, 129, the carton B is in its fully erected condition preparatory to the application of adhesive material to selected spots on the bottom flaps and compression of the flaps to complete the carton structure. After the erection of the carton B, the same is moved from the erecting station 16 to the gluing station 17 by a mechanism illustrated in FIG. 14.

Figure 11:
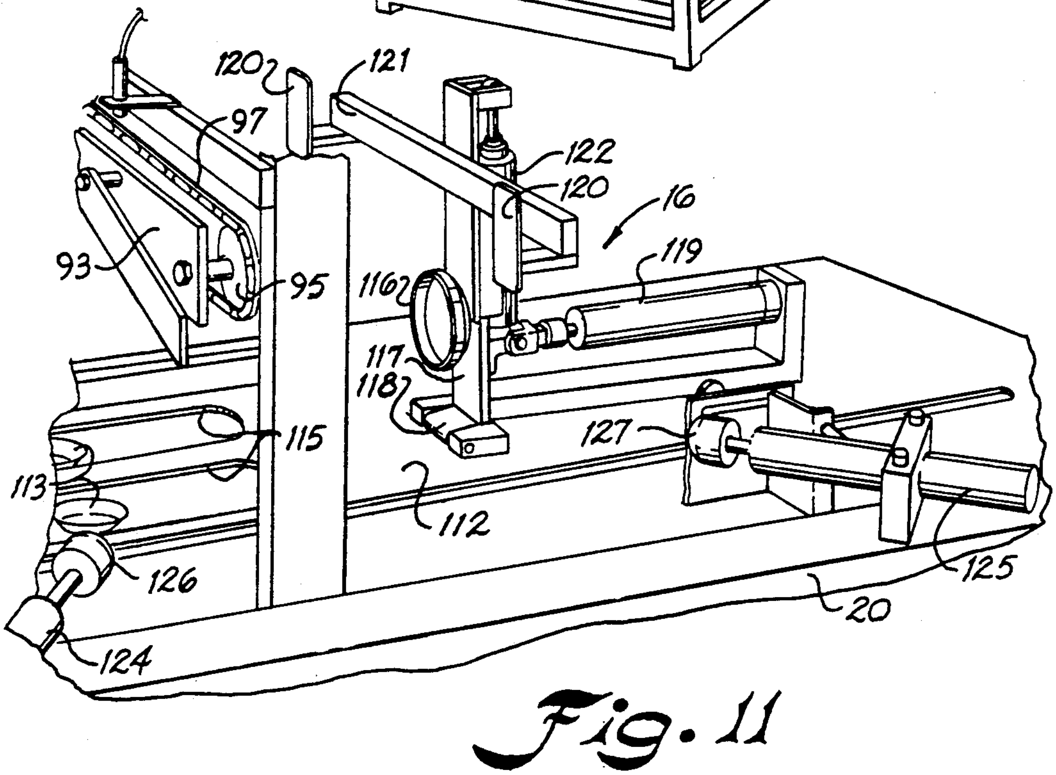
FIG. 11 is an isometric view, partly in section, of the carton erecting station.

As shown in FIGS. 2 and 11, the table 112 is formed with a longitudinal slot 138 which extends across the entire erecting station 16 and into the station 17. A finger 139 protrudes upwardly through the slot and is arranged to engage an erected carton, and, as the finger is driven along the slot, to move the carton to the gluing station. For this movement, the finger 139 is mounted on a chain 140 which is entrained between sprockets on idler 141 and a driven sprocket 142 mounted for rotation to and below the table 112. The sprocket 142 is operatively connected to and driven by a suitable motor 143 also mounted below the table top.

As the carton B is moved from its position shown within the erecting station 16 to the position shown in FIG. 13 at the gluing station 17, the outer edges of the bottom flaps G, H, J and K engage and slide along a vertically oriented anvil plate 145 which causes slightly more inward folding of the respective flaps, and maintains these flaps in a fixed relationship to the remaining structure of the carton.

Immediately after reaching the gluing station 17, a stream of adhesive material is applied to both of the bottom end flaps J and K by a pair of glue applying devices 146, 147 arranged on the opposite side of the anvil plate 145. The devices 146, 147 are adapted to apply gluing material through openings 148 formed in the plate 145, and are positioned to apply the material approximately in the center area for each of the end flaps J, K. As will be noted in FIG. 15, the adhesive material is applied to the end flaps J, K through the space defined by the outer edges of the side flaps G and H. With this arrangement of the flaps G, H during the application of adhesive material, these flaps are in ready position for their further movement onto the end flaps J, K during the formation of a completed, glued bottom panel for a carton. The preflexing or folding of the panels just prior to gluing while a carton is being moved to a gluing station eliminates later operative steps for this purpose, and thereby increases productivity of the machine.

Prior to the application of the adhesive material as described above, a plunger mechanism, generally indicated by the reference numeral 150 as shown in FIGS. 1, 2, 10, 15 and 16, is set into motion in order to arrive in its operative position immediately after adhesive material has been applied to the end flaps. The plunger mechanism 150 comprises a compression plunger head 152 secured at one end of a plunger rod 153 drivingly connected to a piston rod 154 operatively associated with a fluid operable ram 155. The plunger head 152 is adapted to enter into the carton B through its open end and travel for the entire length for engaging the inside surfaces of the bottom flaps G, H, J and K. In this movement, the head 152 drives these flaps against the anvil plate 145 thereby compressing the end flaps G and H upon the end flaps K and J as shown in dotted lines in FIG. 15 for completing the gluing of these parts and the final formation of the completed bottom panel for the carton B.

Figure 15:
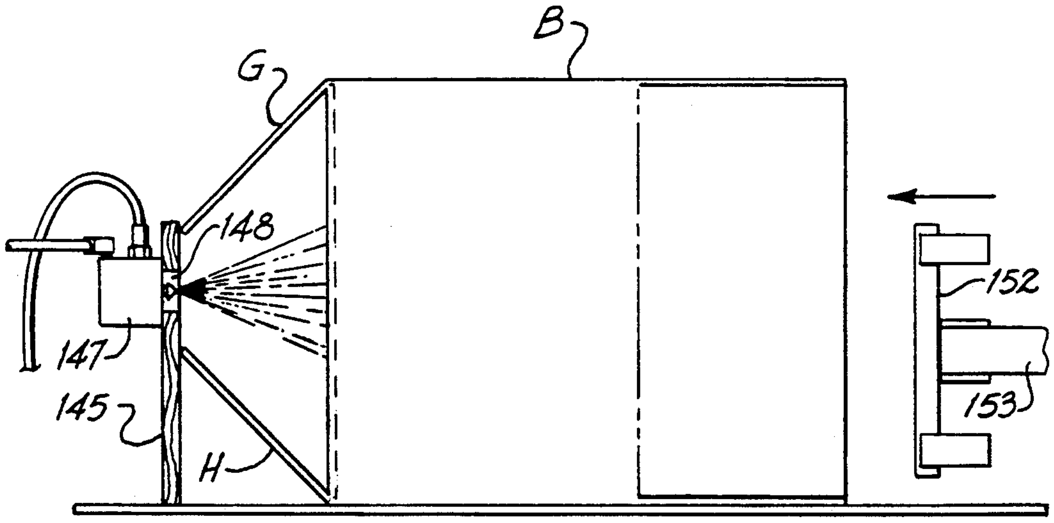
FIG. 15 is a cross-sectional view of the gluing mechanism taken along the line 15—15 in FIG. 2 and showing adhesive material being applied to flaps of the carton blank.
Figure 16:
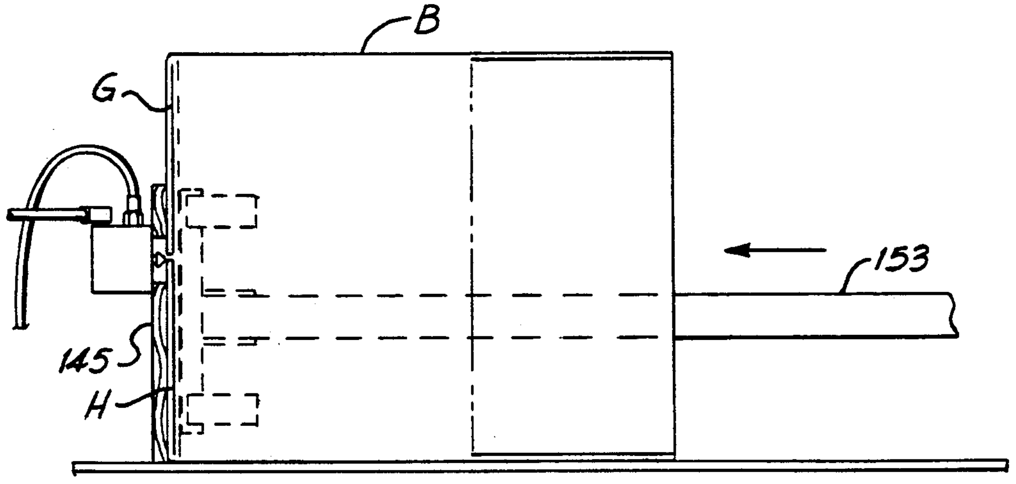
FIG. 16 is a cross-sectional view of a plunger mechanism taken along the line 16—16 in FIG. 2 and showing the application of a physical force against the bottom flaps of the carton blank to adhesively secure the same.

Immediately after this operation, the plunger head 152 is returned to its original position as shown in full lines in FIGS. 10 and 15 and in condition for a similar operation when a succeeding carton B is moved into the gluing station 17. After a carton B has been completely mounted, that is, the bottom flap members have been glued together to complete the mounting of the carton, the same is quickly moved out of the gluing station 17 in order to make room for a succeeding carton or another gluing operation.

In the interest of saving time, and thereby increase the productivity of the machine 10, the adhesive applying devices 146, 147 may be activated as the carton B is being moved to the gluing station 17. The activation of the ram 155 may also be timed to drive the plunger head 152 within the carton B and against the bottom flap members in timing coordination with the activation of the devices 146, 147.

Figure 17:
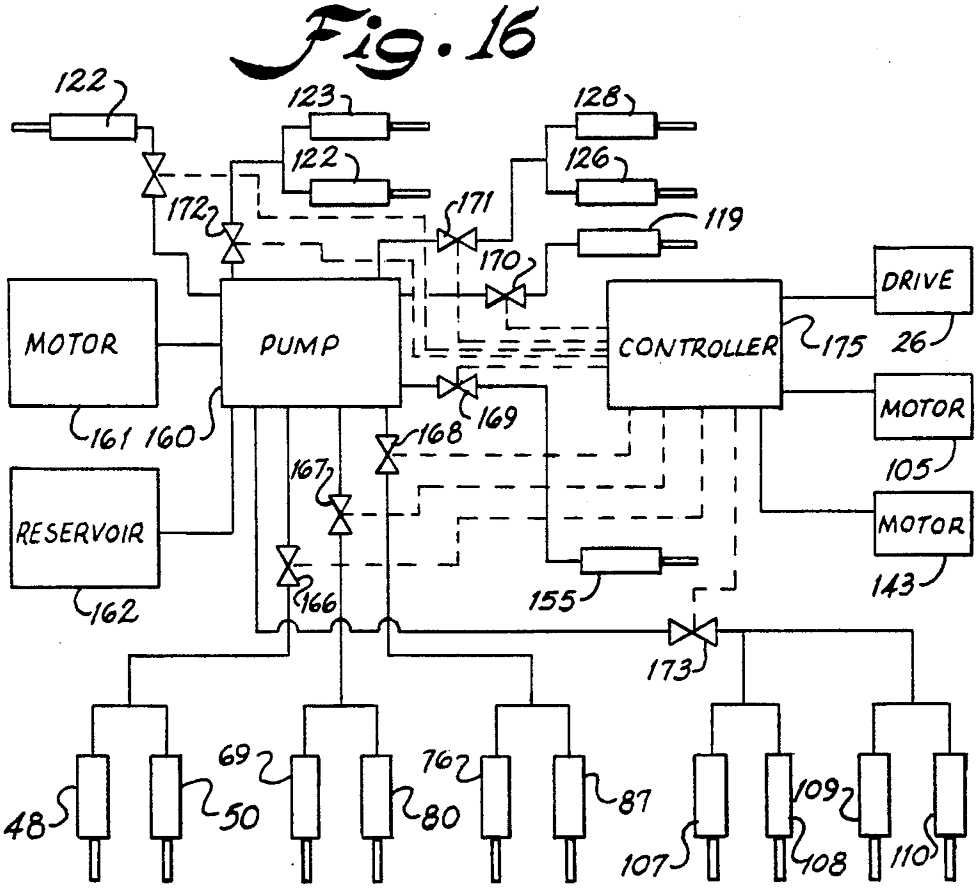
FIG. 17 is a schematic illustration of a control system which may be utilized in the present invention.

In the control system for the carton erecting machine 10, as shown in FIG. 17, a suitable source of fluid pressure is shown for the fluid operable devices described in the foregoing. The source comprises a fluid pump 160 being driven by a motor 161 and including a reservoir 162, all being arranged in the conventional manner. The pump 160, or accumulator therefor, is connected to the fluid devices by suitable fluid lines.

Suitable solenoid valves are operable in the connecting fluid lines for the fluid operable devices in this arrangement: valve 166 for the devices 48, 50; valve 167 for the devices 69, 80; valve 168 for the devices 76, 87; valve 169 for the device 155; valve 170 for the device 119; valve 171 for the devices 126, 128; valve 172 for the devices 122, 123, valve 173 for the devices 107, 108, 109, 110; and valve 174 for the device 122. The valves 166, 167, 168, 169, 170, 171, 172, 173 and 174 are electrically connected to the machine controller for operation thereof under a suitable program to effect automatic operation in timed sequence of the fluid devices and other control components in the machine. The drives 26, 105 and 143 are also electrically connected to the controller for control purposes.

While not illustrated and described in detail, operation of the control devices such as the valves and motors mentioned above may be activated under control of the controller 175 by suitable sensing devices such as photocells and light sources, or limit switches located at strategic positions along the path of movement of the stacks 14 and carton blanks. Since such control arrangements are well known in the art and use thereof not beyond the skill of the art, description thereof is not necessary for the understanding of the present invention.

While a preferred embodiment has been described herein as illustrative of the present invention, it is to be understood that the invention is not to be limited to the exact details of construction and other forms or embodiments may be derived therefrom, such as obvious modifications to one skilled in the art.

What is claimed is:

1. A carton erecting machine for positioning and erecting carton blanks, said carton erecting machine comprising:

a conveyor for transporting stacks of flattened carton blanks in succession to a lift position, means for vertically lifting each stack of carton blanks in timed sequence from said lift position to a feed position, means for sequentially separating each of the carton blanks from the top of said stack while in said feed position and conveying the separated blanks to a work station, means adjacent said work station for erecting said separated carton blanks as the same are moved thereto, and further including a holding member adapted to hold a stack of blanks in said feed position during separation of each of the carton blanks and including power means for moving said holding member out of its holding condition relative to remaining blanks and to a position below the bottom most blank of a succeeding stack when said lifting member moves a succeeding stack from said lift position to said feed position.

2. A carton erecting machine as set forth in claim 1 above, wherein said lifting means includes a lifting member adapted to be moved to a position below a stack of blanks in said feed position, and a power device arranged to drive said lifting member vertically upward to position a stack immediately below a previously lifted stack.

3. A carton erecting machine as defined in claim 2 above, wherein said power device is adapted to lower said lifting member to said lift position to receive a succeeding stack of blanks.

4. A carton erecting machine as defined in claim 1, and further including means co-operable with the trailing and leading edges of each of the blanks when in the feed position for maintaining the flatness of the blanks being fed.

5. A carton erecting machine as defined in claim 1 above wherein said separating means includes a generally horizontally movable element arranged to engage the trailing edge of each of the blanks when in said feed position.

6. A carton erecting machine as defined in claim 5 above, and including at least one member being movable to engage the trailing edges of blanks while being lifted into said feed position thereby conditioning said edges for engagement by said movable element.

7. A carton erecting machine as defined in claim 6, including means for moving said member out of engagement of the same with said trailing edges when said means for lifting a stack is activated.

8. A carton erecting machine as defined in claim 5 and including a second member being movable to engage the leading edges of the blanks being lifted into said feed position and co-operable with at least one member for maintaining flatness of the blanks in said feed position.

9. A carton erecting machine for positioning and erecting carton blanks, said carton erecting machine comprising:

a conveyor for transporting stacks of flattened carton blanks in succession to a lift position, means for vertically lifting each stack of carton blanks from said lift position to a feed position, said means for vertically lifting each stack of carton blanks from said lift position to a feed position including at least one pair of horizontally spaced lifting fingers;

means for sequentially separating each of the carton blanks from the top of said stack while in said feed position and conveying the separated blanks to a work station, means adjacent said work station for erecting said separated carton blanks as the same are moved thereto; and means for holding blanks in said feed position when said lifting means is lifting a succeeding stack of blanks, said means for holding including at least one pair of holding fingers, said at least one pair of holding fingers being spaced horizontally a greater distance that the spacing of the at least one pair of horizontally spaced lifting fingers.

* * * * *